April 17, 1945.  L. RANNEY  2,373,976
SURVEYING INSTRUMENT
Filed Aug. 1, 1942  3 Sheets-Sheet 1
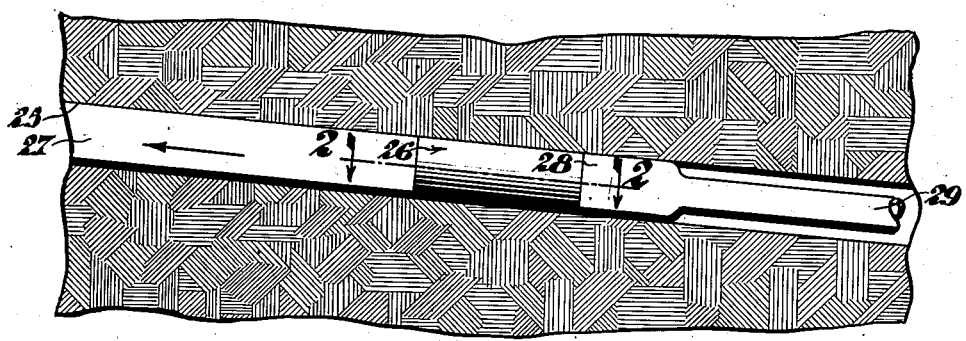
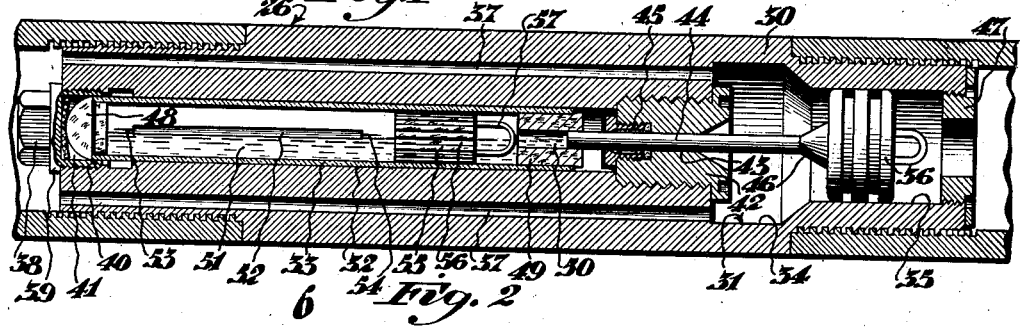
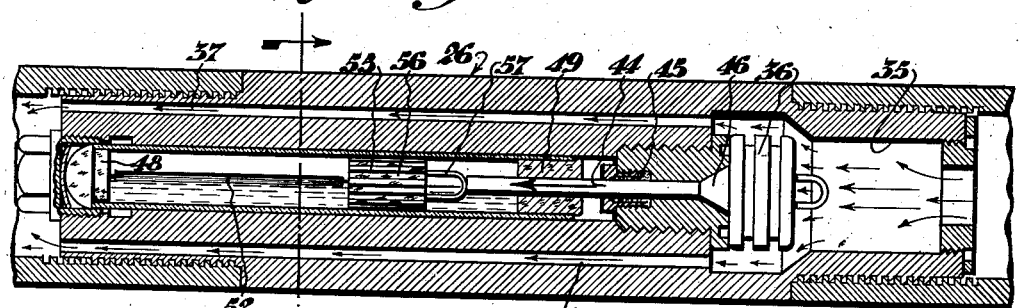
 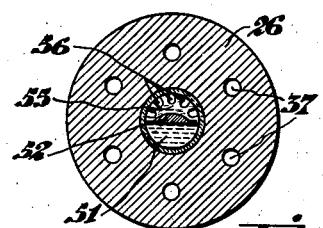
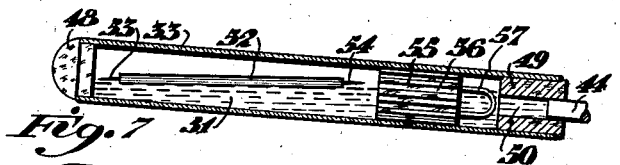
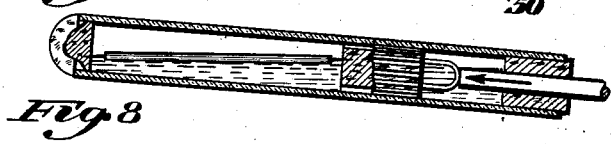
INVENTOR.
Leo Ranney
By Green & McCallister
His ATTORNEYS April 17, 1945.            L. RANNEY                2,373,976
                       SURVEYING INSTRUMENT
             Filed Aug. 1, 1942            3 Sheets-Sheet 2
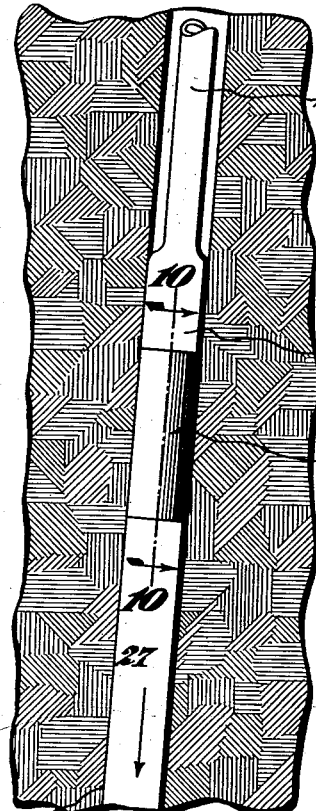
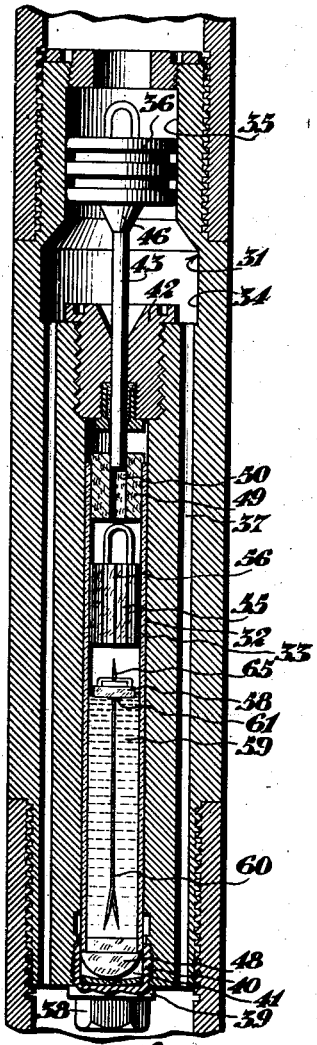
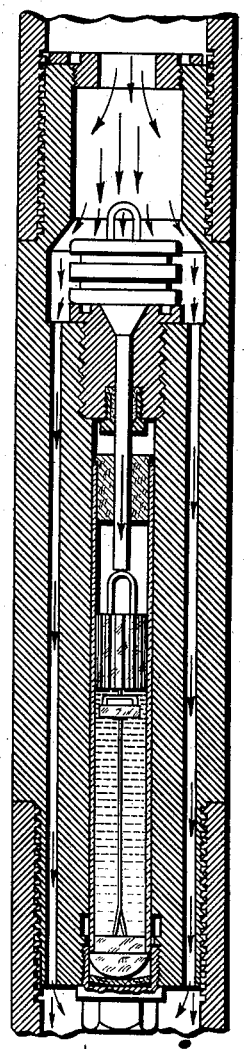
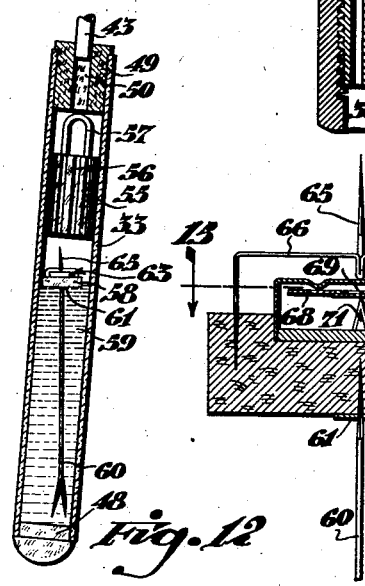
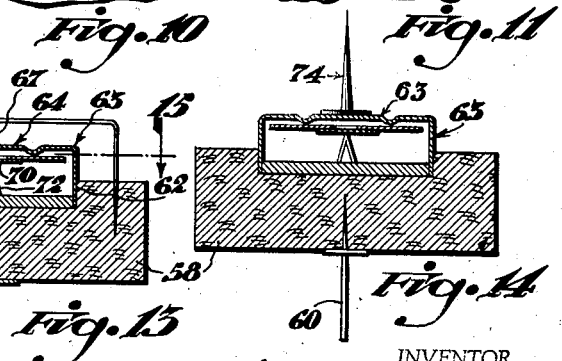
INVENTOR.
Leo Ranney
BY Green & McCallister
His ATTORNEYS April 17, 1945.  L. RANNEY  2,373,976
SURVEYING INSTRUMENT
Filed Aug. 1, 1942   3 Sheets-Sheet 3

INVENTOR.
Leo Ranney
BY Green & McCallister
His ATTORNEYS

Patented Apr. 17, 1945

2,373,976

UNITED STATES PATENT OFFICE 2,373,976

SURVEYING INSTRUMENT

Leo Ranney, McConnelsville, Ohio

Application August 1, 1942, Serial No. 453,301

10 Claims. (Cl. 33—205)

This invention relates to the art of drilling oil wells or the like, and is particularly directed to surveying apparatus for automatically surveying the hole being drilled. One of the problems attendant upon the drilling of oil wells, whether horizontal or vertical, is that of determining the direction the drilling is taking so that the drilling operation may be varied in order to maintain the drilling in the desired direction. For an understanding of the art of drilling horizontal wells reference may be had to my Patent 2,280,851 of April 28, 1942, but the present invention is not limited to apparatus for surveying horizontal wells.

An object of the present invention is to provide surveying apparatus which enables the operator to make a survey instantly and automatically at some interval during the drilling operation, as for example just before each core is taken.

A further object is to provide apparatus and procedure for surveying a drilled well as an incident to the drilling operation and in which the survey remains intact during some portion of the drilling operation and until the drilling equipment is withdrawn from the well, for example, during a core removing operation.

A further object is to provide apparatus for surveying a horizontally extending well or drilling which will disclose the elevational direction of the hole and which provides a positively accurate reading which can be readily understood.

A further object is to provide a procedure for surveying a well or drilling which is entirely mechanical, i. e., one which is not based on either etching a glass container or producing and developing a photographic negative.

A further object is to produce an improved procedure for surveying drilled holes or wells which is not only effective in determining variations from the horizontal in a horizontal well or variations from the vertical in a vertical well but which is also capable of determining the lateral drift of a horizontal well.

Other objects and certain advantages will be made apparent in a description of the accompanying drawings in which:

Figure 1 is a view taken through the earth showing a section of the hole being drilled, the hole slanting upwardly.

Figure 2 is a sectional view taken on line 2—2, Figure 1, illustrating the surveying instrument when it is in a level position and before it is set.

Figure 3 is a view taken similar to Figure 2, showing the surveying instrument (when level) set by means of the water and mechanical pressure.

Figure 4 is a plan view of the float.

Figure 5 is a side view of the cylindrical element which engages the float.

Figure 6 is a sectional view taken on line 6—6,

Figure 3, illustrating the arrangement of the bypasses for the water.

Figure 7 is a longitudinal sectional view of the test tube showing the float in the position it assumes when the boring is taking place upwardly.

Figure 8 is a view taken similar to Figure 7, after the completion of the survey, that is, with the float set in position.

Figure 9 is a view taken through the earth showing a portion of a vertical hole being drilled, showing the hole laterally deflected.

Figure 10 is a sectional view taken on line 10—10, Figure 9, showing the details of the surveying instrument (when vertical) and its position prior to the operation of setting the surveying instrument.

Figure 11 is a view taken similar to Figure 10, showing the surveying instrument in set position.

Figure 12 is a sectional view taken longitudinally of the test tube showing it in the position it assumes when the hole is deflected as in Figure 9.

Figure 13 is an enlarged sectional view taken through the float and detailing one form of compass, wherein the compass is set by the pressure of the needle which sets the float.

Figure 14 is a view taken similar to Figure 13 showing a modification wherein the compass is set by means of the needle attached directly to the upper wall of the compass.

Figure 15:
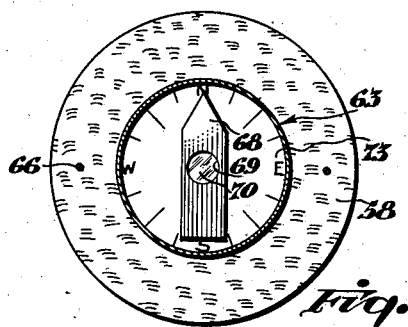

Figure 15 is a sectional view taken on line 15—15, Figure 13 further illustrating the compass.

Figure 16:
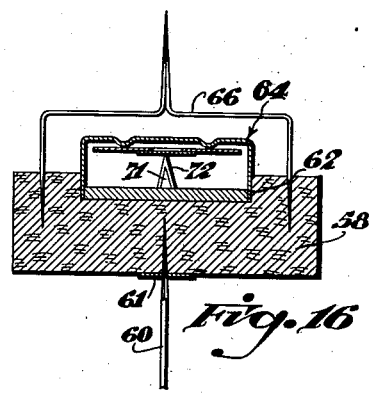

Figure 16 is a view taken similar to Figure 13, but illustrating a modified form of the compass wherein it is set by the direct application of water pressure.

Figure 17:
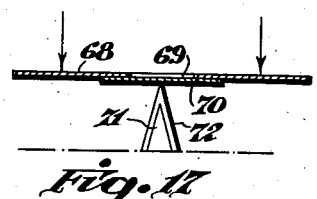

Figure 17 is a detailed sectional view showing the compass disc free to rotate on the knife blade.

Figure 18:

Figure 18 is a view similar to Figure 17, showing the compass set upon the knife blade.

Figure 19:
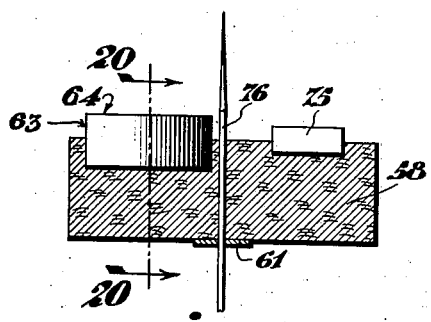

Figure 19 is a sectional view taken similar to Figure 13 but showing a modification, wherein the compass is at one side of the needle which sets the cork float.

Figure 20:
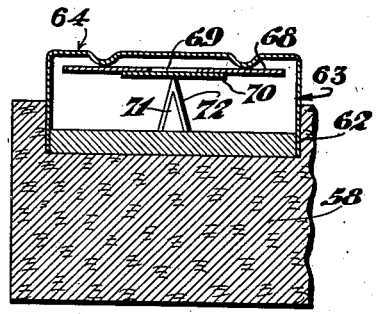

Figure 20 is a sectional view taken on line 20—20, Figure 19.

Figure 21:
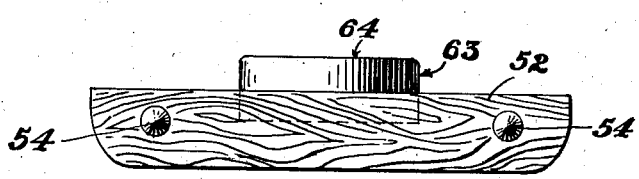

Figure 21 is an end view of the float of the horizontal type of surveying instrument showing a compass mounted thereon.

Figures 1 to 8 inclusive disclose an instrument for surveying the deviations of a bore from the horizontal. Otherwise expressed, the instrument surveys the angle at which a selected section of the bore is rising or falling, i. e., deviating from the horizontal as it progresses away from the mouth of the well.

Referring specifically to Figure 1, the bore as illustrated at 25 is upwardly inclined in the direction away from the well opening; in the drawings, the mouth of the well is assumed to be at the right and the last drilled portion of the bore is at the left. For simplicity, the terms right and left will be used to designate the above mentioned ends of the horizontal drilling or bore.

A surveying instrument 26 is shown positioned in the bore 25 between a core barrel 27 on the left, and a sub 28 connecting it to a section of drill pipe 29 on the right.

The surveying instrument is composed of a cylindrical casing 30 carrying threads about its periphery at both ends for engagement with the threaded ends of the core barrel and sub, respectively. The casing 30 has a central bore 31 which is divided into three chambers of varying diameters. The chamber 32 at the left end of the bore is of sufficient diameter and length to receive the house snugly a tube 33 such as a test tube. The intermediate or escapement chamber 34 is of much greater diameter. The chamber at the right end is a cylinder bore 35 adapted to encase a piston 36. The piston is provided with a series of circumferential sealing grooves in its surface. The escapement chamber 34 is in communication with the internal bore of the core barrel through a plurality of bores 37 which extend parallel to the test tube chamber through the casing 30. The bores 37 provide a pass for liquid or air through the casing around the test tube chamber.

Chamber 32, which houses the tube 33, is closed at its left end by a headed bolt 38 threaded into the bore and having an abutment shoulder 39 and a threaded portion 40. The threaded portion includes a central bore or recess 41, which is padded, to receive the closed end of the test tube 33. A head 42 is threaded into the other end of the test tube chamber 32 and serves, through a central opening 43, to slidably support a piston rod or plunger 44 extending from the piston 36. A packing gland 45 is provided in the opening in the head 42 to form a seal around the plunger. The seal around the plunger is also assisted by a tapered portion 46 of the plunger near its joint to the piston head. This tapered portion 46 engages a similarly tapered seat in the head of the bolt 42 and is effective as a seal when the piston is moved to its extreme inward position, (Figure 3).

The end of the central bore 31 at the cylinder bore is open to the inside of the drill pipe through a central opening in a plug 47.

The test tube has its closed end plugged by a cork stopper 48, the inside face of which serves as a pin cushion to receive a pair of pins (described at a later point in the specification). The exposed face of the cork acts as a bumper to receive any shocks that this end of the tube may receive and is preferred over a glass end because the glass test tube is usually weak at this particular point. The exposed end of the cork 48 may be rounded to fit easily into the padded recess 41 in the bolt 38. The other end of the tube has a stopper 49 of cork or some other resilient material bored centrally as at 50 to receive the end of the plunger. The opening 50 is closed and water-tight when the plunger is inserted into it.

The test tube is half-filled with a liquid 51 on which a float 52 is supported. The float has pointed pins 53—53 and 54—54 extending outwardly from both ends. A cylindrical cork 55 is fitted into the test tube, to the right of the float, and has its peripheral surface fluted as at 56.

The flutes decrease friction between the inside surface of the test tube and the cork and allow the liquid in the test tube to pass around the cork when it is moved longitudinally inside the test tube. A staple 57 formed from flattened metal, is carried by the fluted cork. This staple is positioned in the end nearest the plunger, to serve as a contact for the plunger and as a means for removing the cork from the test tube by means of a hook.

*Operation of horizontal bore surveying instrument*

The survey is made before the core is cut and remains intact during the cutting of the core. It is recovered when the full core barrel is removed from the hole.

First of all, a measured quantity of water is poured into the test tube to fill it one-half full when corked. The float is then inserted and the fluted cork is pushed in a measured distance so that the prongs of the surveying float are clear. The piston and outer cork are then inserted and the test tube is placed in the surveying section of the core barrel. The drill rod is screwed into the core barrel with the piston disposed in its cylinder. The assembled tools are then run into the hole to the face thereof, and water is pumped into the drill rods.

When the water or the air pressure ahead of the water reaches the cylinder chamber 35, the piston 36 is forced out of its cylinder and consequently the piston rod or plunger is forced into the test tube. As the plunger moves in under influence of the pressure, it contacts the staple 57 and starts to push the fluted cork ahead of it; the liquid in the test tube flowing back around the cork through the flutes. As the fluted cork is pushed farther into the test tube, its face nearest the float comes into contact with the pins 54—54 on the float. The float is pushed ahead of the fluted cork until the other pair of pins 53—53, on the float, contacts the inner face of the cork stopper 48. At this time, the two pairs of pins stick into the two faces of the corks and become more and more deeply imbedded as the fluted cork is forced on them.

The packing 45 and the cork stopper 49 fit tightly enough around the plunger 44 to provide enough frictional hindrance to the plunger's movement to cause it to move into the test tube slowly so as not to disturb the tranquility of the liquid in the test tube.

The length of the plunger is such that when the taper on the plunger seats in the taper in the bolt 41, the fluted cork has been pushed far enough into the test tube to embed the two pairs of pins 53—53 and 54—54 in their respective cork cushions to "set" the survey. The angle at which the float is positioned, when set, with respect to the axis of the test tube, and consequently the axis of the bore determines the degree of angulation of the bore away from the horizontal at this point. When the plunger reaches its extreme inward position, the cylinder bore is open through the escapement chamber and the plurality of bores to the inside of the core barrel. Under these conditions water flows from the drill pipe, into the cylinder, through the escapement chamber and bores 37 to the core barrel. This flow of water is illustrated by the arrows in Figure 3 of the drawings.

Drilling proceeds until the core barrel is full of core, whereupon the tools are withdrawn. The test tube is removed and placed in the compartment of a ten foot straight edge and tilted until the water in the test tube is in the same position with relation to the float that it had in the hole. The tilt of the straight edge will then give the deflection per ten feet.

Although the instrument is disclosed above cooperating with a core barrel, it can be readily seen that it may be used by itself, with a drill head or with some other tool. Then too, it may be utilized to survey any section of a bore, whether it be in the innermost, intermediate, or outermost section of a well. By keeping a record of the number of feet of drill pipe utilized at the point of survey, a very accurate chart of the bore's course may be drawn.

For determining the lateral deviations of a horizontal bore, a compass may be included with the float. This modification is disclosed at a later point in the specification.

Figures 9 to 13 disclose an instrument for surveying vertical bores. The survey is a measurement of the angle and direction of drift of a bore away from the vertical. The instrument differs from the horizontal surveying instrument only in the arrangement of the float chamber inside the test tube. In this instance, a compass is provided, in addition to a float, to determine the direction in which the angulation of the bore is "drifting."

A float 58 is supported on a liquid 59 which half fills the test tube. The cork is a flat cylinder being wider than it is thick, to float more steadily. A double pointed needle 60 depends from the center of the bottom of the float 58 to a point just above the cork stopper 48. The upper end of the needle 60 also may be pointed so that it can be stuck into the bottom of the cork float to be fastened thereto. A washer 61 may be tack-welded or fastened by other means to the needle near the upper point to provide a shoulder so that the needle cannot be forced too far into the float.

The upper face of the cork has a central recess 62 in it for the reception of a compass box 63. The compass will be discussed at a later point in the specification and it is sufficient to say here that the compass needle is locked when the top 64 of the compass box is bent inwardly.

A shorter needle 65 extends upwardly from the top of the cork float. One form for such a needle is disclosed in Figure 13 of the drawings. The needle 65, in this instance, is carried by a wire wicket 66 which straddles the compass box 63. The wicket has the ends of both of its legs sharpened to facilitate their insertion into the upper face of the cork float. An extension 67 depends from the middle of the wicket to contact the center of the top 64 of the compass box. It is to this extension that the needle 65 is secured by a spot weld or other means. The extension is formed, in this instance, by an excess of wire of the wicket being bent downwardly at right angles to the line of the top of the wicket at the middle point in the wicket and then doubled back upon itself to form a closed U. Any downward pressure on the needle 65 is transmitted to the top 64 of the compass box to lock the needle of the compass in the position it happens to be in at the moment the pressure is applied.

*Operation of vertical bore surveying instrument*

The vertical bore surveying instrument is operable similarly to the horizontal bore surveying instrument in that the survey is "set" by the plunger when it is forced into the test tube by water or air pressure acting on its piston, and therefore, a description of this action will not be repeated here.

As the plunger moves in on the fluted cork 55, it starts to push the fluted cork ahead of it. When the fluted cork 55 contacts the pointed needle 65 it pushes the float down into the liquid and embeds the double pointed prongs in cork stopper 48 and needle 65 in itself. As the fluted cork continues downwardly, the needles become embedded more deeply into the corks, locking the float in position. At the same time the downward pressure on the upper needle, and consequently the extention 67, locks the compass in position by indenting the top of the compass.

It is readily seen that the length of the plunger must be such that when the piston is in its extreme inward position, the needles 60 and 65 are just embedded deeply enough to hold the float unit from moving. It is also noted that the cork float 58 preferably floats loggily in the liquid so that it may be pushed under the surface of the liquid without moving in its effort to remain afloat. The double pointed needle is preferably held just clear of the face of the cork stopper 48 by the float 58 so that the float unit does not have to move far before the needles embed themselves in the corks 48 and 55.

The angulation of the axis of the needle 60 when "set" with respect to the axis of the test tube and consequently the axis of the bore of the well determines the degree of the bore from vertical at the point of survey. From the direction in which the compass needle is pointing when locked, the direction of the angulation can be determined. From the two factors, angulation and direction, a three dimensional location of the position of the bore at the point of survey may be determined.

*The compass*

Figures 13 to 21 illustrate the compass equipped with various means for "setting" the magnetic needle in order to determine the "drift" of the bore. In all illustrations the compass box 63 is circular and has a flexible, diaphragm-like cover 64 which, for convenience of reading the position of the magnetic needle, may also be transparent. The side wall of the box may or may not be flexible but in most compass structures it will provide a rigid support for the edge of the flexible cover 64. The magnetic needle 68 is shown as pointed at its "north" pole to facilitate reading the scale 73 with which the bottom of the box 63 or its transparent cover 64 may be provided.

The needle 68 is shown provided with a central aperture 69 which is covered by a sheet 70 of Cellophane or some similar material which is suitably secured to the needle 68. The needle is balanced on the point of a triangular knife blade 71, the apex of which contacts the sheet 70 at the center of balance of the needle. In order to accomplish this and also prevent the accidental displacement of the needle with relation to its support 71, the sheet 70 may be so formed as to provide a depression in its lower face which receives the apex of the support 71 and constitutes a bearing surface which will facilitate the swing of the needle around its support.

While the apex of the support 71 is so formed as to provide a bearing surface for the needle, it is nevertheless of such size as to easily puncture the Cellophane when the magnetic needle is forced downwardly upon it. The converging edges 72 of the support 71 are preferably sharp so that when the point of the support breaks through the material of the sheet 70 these sharp edges will slit the material as the needle moves downwardly with relation to the support and thus "set" the needle in non-swinging relationship to the support 71 and the scale 73, with which the compass box may be provided. This action of the prism-like, knife support 71 on the Cellophane sheet is illustrated in Figure 18 of the drawings. Cellophane is quite resistant to initial fracture but after fracture it is readily slit or torn. It is these characteristics of Cellophane which recommend its use as the bearing material for the magnetic needle 68.

The several modifications of the compass differ from each other in the manner in which the "set" of the magnetic needle is accomplished. For example, the apparatus illustrated in Figure 14 differs from that illustrated in Figure 13 in that the cover 64 carries a sharply pointed tack 74, the head of which is secured to the central portion of the cover. This tack performs the function of both the needle 65 and the extension 67 of the apparatus illustrated in Figure 13.

Where the cover 64 is depressed by mechanical means such as the tack 74 or the extension 67, it is not essential for the compass box to be air tight. In Figures 16, 19, 20 and 21 the compass installation is such that the flexible cover 64 is depressed and the magnetic needle 68 is set by external air pressure. Where this is the case, the compass box must necessarily be air tight.

In Figures 19 and 20 the compass box 63 is located on one side of a needle-pointed pin 76 which replaces both the pins 69 and 65 of Figure 13 in that it engages the corks 49 and 55 in the operation of locking the float in position between those two elements. As shown in Figure 19, the compass box is counterbalanced by a weight 75 carried by the float 58.

Figure 21 is an end view of a horizontal float equipped with a compass box 63 such as has heretofore been described. As illustrated, the compass box is located midway between the lateral edges and midway between the ends of the float so as to avoid subjecting the float to a tilting force. The compass may be similar to the compass previously described. That is to say, the magnetic needle 68 may be mounted on a triangular knife blade 71 through the agency of a Cellophane or similar inset 70 as illustrated in Figure 13. The box 63 may be and preferably will be cylindrical and will be provided with a flexible cover 64 which is capable of being forced inwardly, with relation to the interior of the box 63, by external air pressure so as to exert force on the magnetic needle 68 and thereby puncture the inset 70 and thus "set" the magnetic needle in a non-swinging position with relation to its support 71.

As the piston 36 moves under the influence of liquid or air pressure in the chamber 35 and thus moves the plunger 44 through the aperture in the stopper 49 and into the tube 32, the internal volume of the tube 32 is reduced with a resultant increase in internal air pressure. It is this increase in air pressure which deflects the diaphragm-like cover 64 of the compass box 63 and "sets" the position of the magnetic needle 68 on its support 71. Where a variation in air pressure, such as is above described, is depended upon to thus "set" the needle, the compass box will, of course, be maintained air tight and the cover 64 will be of such form as to readily respond to even a slight variation in external pressure.

From the foregoing it will be apparent that a compass, such as illustrated, will function in designating the "drift" or lateral deviation of a horizontal bore from the desired direction, when mounted on the float of the surveying instrument. With such an arrangement the float not only designates the deviation of the bore from the horizontal but it also maintains the compass box horizontal until after the magnetic needle is "set" and in this way contributes to an accurate functioning of the compass.

From the foregoing it will be apparent that the surveying apparatus here contemplated broadly involves a container, a gravity adjusted device within the container and means for locking the device in a fixed position with relation to the container; that the container is adapted to be introduced into a bore and is so formed as to be positioned by engagement with the side of the bore so that the major axis thereof extends in the same direction as the longitudinal axis of the portion of the bore in which the receptacle is located. The apparatus also contains a lateral drift indicating mechanism, preferably carried by said device and means for setting said mechanism.

More specifically defined, the surveying instrument constituting my invention consists of a container, such as above described, which encloses a liquid-containing receptacle having a self-levelling device located therein, combined with pressure-actuated means for locking the device in a fixed position with relation to the receptacle and means for motivating said locking means. The container is so formed that when introduced into an aperture, such as bore 27, its major axis will lie substantially coincident with or parallel to the longitudinal axis of the portion of the bore in which the container is located. A still more specific embodiment of my invention involves the container, the receptacle, the self-levelling device and the locking and motivating means above defined, together with a direction-indicating device, such as a compass, which is carried by the self-leveling device and is adapted to be "set" so that the magnetic needle thereof is held in a fixed position with relation to the locked self-levelling device.

While I have described several embodiments of my invention it will be apparent that still further changes may be made in the apparatus illustrated without departing from the spirit and scope of the invention as defined by the appended claims.

What I claim is:

1. A surveying apparatus for apertures such as oil and gas wells comprising an elongated casing adapted to be introduced into such an aperture in alignment therewith and having a liquid delivery passage extending longitudinally therethrough, a removable container located within said casing in a fixed position with relation thereto, a self-adjusting direction-indicating device located in said container, a pressure responsive piston located within said passage and movable in response to pressure applied thereto, a fluid pressure responsive element located within said container for locking said device in a fixed position and a plunger actuated by said piston to increase the fluid pressure within said container and thereby actuate said element to lock said device against motion relatively to said container.

2. A surveying apparatus of the character described, comprising a casing having a liquid delivery passage extending lengthwise thereof, a removable container located within said casing adjacent said passage, a self-adjusting direction-indicating device located in said container, a piston located within said casing and movable in response to pressure delivered to said passage, fluid pressure actuated means within said container for locking said device in a fixed position and means actuated by said piston for increasing the fluid pressure within said container to actuate said means to lock said device in a fixed position with relation to said container.

3. A surveying apparatus of the character described comprising a casing having a liquid delivery passage extending lengthwise thereof, a sealed liquid container located within said casing adjacent said passage, a float located within said container, a compass carried by said float, fluid-pressure actuated means for locking the needle of said compass in a fixed position and means within said casing extending into said container and movable in response to pressure applied to said passage for locking said float in a fixed position with relation to said casing and for increasing the fluid pressure within said container to actuate said fluid pressure actuated means.

4. A surveying apparatus for apertures such as horizontal oil or gas wells, comprising an elongated casing adapted to be introduced into such an aperture in alignment therewith, an elongated container located within the casing in a fixed position with relation thereto, a liquid partially filling said container and an elongated float having a substantially flat bottom supported by said liquid with its longitudinal axis parallel to the axis of said casing and means for locking said float in a fixed position with relation to said casing.

5. A surveying apparatus for apertures such as horizontal gas wells, comprising an elongated cylindrical casing adapted to be introduced into such an aperture in alignment therewith, an elongated container located within, extending coaxially of and removably secured to said casing, a liquid partially filling said container, an elongated float having a substantially flat bottom located within said container and supported by said liquid with its longitudinal axis parallel to the longitudinal axis of said casing, prongs carried by the ends of said float, penetratable members located within said container at opposite ends of said float and means for moving one such member longitudinally of said container and forcing said prongs into engagement with both said members.

6. A surveying apparatus for apertures such as oil and gas wells, comprising an elongated casing adapted to be introduced into such an aperture in alignment therewith and having a liquid delivery passage extending longitudinally therethrough, an elongated container partially filled with liquid located within said casing in a fixed position with relation thereto, adjacent said passage, an elongated float within said container and supported by the liquid container therein, a compass carried by said float, a fluid pressure responsive element within said container for locking the needle of said compass in a fixed position, means located in said container movable with relation thereto into engagement with said float to lock it in a fixed position within the container, a pressure responsive piston located within said passage and movable in response to pressure applied to said passage and a plunger extending into said container and actuated by said piston to move said means into float-locking engagement with said float and to increase the fluid pressure within said container to thereby actuate said fluid pressure responsive element to lock the needle of said compass in a fixed position.

7. A surveying apparatus of the character described, a casing having a liquid delivery passage extending therethrough, a container partially filled with liquid located within said casing in a fixed position with relation thereto, a float within said container and supported by the liquid contained therein, a compass carried by said float and provided with a pressure responsive cover movable to lock the needle of said compass against movement about its pivot point, means located within said container and in frictional engagement with the internal surface thereof and movable into engagement with said float to lock the same in a fixed position with relation to said container, a piston movable in response to pressure within said passage, and a plunger extending into said container and actuated by said piston to move said means into float-locking engagement with said float and to increase the fluid pressure within said container to thereby actuate said cover to lock the compass needle against movement.

8. A surveying apparatus for apertures such as horizontal gas wells, comprising an elongated cylindrical casing adapted to be introduced in such an aperture in alignment therewith, an elongated container removably locked in a fixed position within said casing and partially filled with liquid, an elongated float located within said container and supported by such liquid, float locking elements located within said casing on opposite ends of said float, one such element being movably positioned within said casing by frictional engagement with the inner surface thereof and means for moving said last mentioned element along said casing to lock said float in a fixed position with relation to said casing.

9. A surveying apparatus for apertures such as horizontal gas wells, comprising an elongated cylindrical casing adapted to be introduced in such an aperture in alignment therewith and having a passage extending longitudinally therethrough, an elongated container removably locked in a fixed position within said casing and partially filled with liquid, an elongated float located within said container and supported by such liquid, float locking elements located within said casing at opposite ends of said float, one such element being movably positioned within said casing by frictional engagement with the inner surface thereof.

10. A surveying apparatus for apertures such as horizontal gas wells comprising an elongated cylindrical casing adapted to be introduced in such an aperture in alignment therewith and having a passage extending longitudinally therethrough, an elongated container removably locked in a fixed position within said casing and partially filled with liquid, an elongated float located within said container and supported by such liquid, float locking elements located within said casing at opposite ends of said float, one such element being movably positioned within said casing by frictional engagement with the inner surface thereof, a piston responsive to pressure applied to said passage and means actuated by said piston for moving said movably positioned element into locking engagement with said float.

LEO RANNEY.